United States Patent
Bottomley et al.

(10) Patent No.: US 6,252,918 B1
(45) Date of Patent: Jun. 26, 2001

(54) METHOD AND APPARATUS FOR DIGITAL SYMBOL DETECTION USING MEDIUM RESPONSE ESTIMATES

(75) Inventors: Gregory E. Bottomley; Karl Molnar; Rajaram Ramesh, all of Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/267,378

(22) Filed: Mar. 15, 1999

Related U.S. Application Data

(62) Division of application No. 08/766,167, filed on Dec. 12, 1996, now Pat. No. 5,889,827.

(51) Int. Cl.[7] .................................................. H04B 1/10
(52) U.S. Cl. .................................................. 375/350
(58) Field of Search .................... 375/350, 316, 375/341, 262, 377, 253, 340

(56) References Cited

U.S. PATENT DOCUMENTS

| | | | |
|---|---|---|---|
| 4,539,675 | 9/1985 | Fisher | 370/32 |
| 4,977,580 | 12/1990 | McNicol | 375/97 |
| 5,166,952 | 11/1992 | Omurg et al. | 375/1 |
| 5,191,598 | 3/1993 | Backstrom et al. | 375/100 |
| 5,253,268 | 10/1993 | Omura et al. | 375/1 |
| 5,428,602 | 6/1995 | Kemppainen | 370/18 |
| 5,533,067 | 7/1996 | Jamal et al. | 375/341 |
| 5,768,307 | 6/1998 | Schramm et al. | 375/208 |
| 5,796,776 | 8/1998 | Lomp et al. | 375/222 |
| 5,799,010 | * 8/1998 | Lomp et al. | 370/335 |
| 6,049,535 | * 4/2000 | Ozukturk et al. | 370/335 |
| 6,084,929 | * 7/2000 | Molnar et al. | 375/350 |
| 6,108,517 | * 8/2000 | Arslan et al. | 455/21 |

OTHER PUBLICATIONS

International Search Report re: PCT/US97/21633; Date of Mailing of Search Report: Apr. 1, 1998.

M. Torlak et al.: "An Improved Signature Waveform Estimation Approach In Synchronous CDMA Systems", 1996 IEEE 46th Vehicular Conference, vol. 1, pp. 569–573 (Apr. 28, 1996–May 1, 1996).

S.V. Schell et al.: "Improved Performance of Blind Equalization Using Prior Knowledge of Transmitter Filter", Proceedings of the Military Communications Conference ( MILCOM), pp. 128–132 (Oct. 2–5, 1994), vol. 1 of 3 (Oct. 2, 1994).

(List continued on next page.)

*Primary Examiner*—Stephen Chin
*Assistant Examiner*—Mohammad Ghayour
(74) *Attorney, Agent, or Firm*—Coats & Bennett, PLLC

(57) ABSTRACT

According to the present invention, the effects of the transmission medium on transmitted information symbols are estimated separately from other effects, e.g., those associated with receive and transmit filters, using knowledge of the pulse shaping. The medium response estimate is then used to detect information symbols. Previously, receivers had used estimates of the composite channel to detect symbols. This, however, assumed uncorrelated noise, which is not always the case.

16 Claims, 6 Drawing Sheets

OTHER PUBLICATIONS

Y. Wan et al., "A Fractionally–Spaced Maximum–Likelihood Sequence Estimation Receiver in a Multipath Fading Environment", ICASSP, vol. 4, pp. IV689–IV692 (1992).

W. H. Sheen et al., "MLSE Equalization and Decoding for Multipath–Fading Channels", IEEE Trans. Commun., vol. 39, vol. 39, No. 10, pp. 1455–1464 (Oct. 1991).

K. Hamied et al., "A Fractionally Spaced MLSE Receiver", ICC, pp. 7–11 (1995).

G.M. Vachula et al., "On Optimal Detection of Band–Limited PAM Signals with Excess Bandwidth", IEEE Trans. Commun. vol. 29, No. 6, pp. 886–890 (Jun. 1981).

K. Balachandran et al., "Receive Filters for Bandlimited Intersymbol Interference Channels", Conf. on Info. Sciences and Systems (CISS), 5 pages (Mar. 1996).

H. Meyr et al., "On Sampling Rate, Analog Prefiltering, and Sufficient Statistics for Digital Receivers", IEEE Trans. Commun. vol. 542, No. 12, pp. 3208–3214 (Dec. 1994).

G. E. Bottomley, "Adaptive MLSE Equalization Forms for Wireless Communications", Fifth Virginia Tech Symposium on Wireless Communications, (May 31–Jun. 2, 1995) 12 pages.

* cited by examiner

METHOD AND APPARATUS FOR DIGITAL SYMBOL DETECTION USING MEDIUM RESPONSE ESTIMATES

This application is a divisional of application Ser. No. 08/766,167, filed Dec. 12, 1996 U.S. Pat. No. 5,889,827.

BACKGROUND

The present invention relates generally to communication systems and, more particularly, to coherent demodulation in digital communication systems.

Digital communication systems are developing rapidly for both wireline and wireless applications. In such systems, information is converted to information symbols, typically binary in value. These symbols are then encoded and modulated to a form that can be transferred onto a transmission medium, such as wires, the air (using radio waves or acoustic pressure), or magnetic tape. This transmission process includes the use of pulse shaping, to shape the symbol values for transmission.

As the demand for communications grows, higher data rates are employed in wireline modems. As a result, the modulation and/or transmission medium introduces intersymbol interference (ISI), in which one symbol overlaps with the next. To provide acceptable performance, equalization at the receiver is required, such as linear equalization, decision feedback equalization, or maximum likelihood sequence estimation (MLSE).

Equalization is also required in many wireless communications systems. These systems include those defined by D-AMPS, PDC, and GSM, which employ a combination of frequency division multiple access (FDMA) and time division multiple access (TDMA). Therein, the transmission medium is dispersive due to multipath propagation, giving rise to ISI at the receiver.

New forms of modulation and multiple access have been introduced in wireless communications, such as spread spectrum modulation and code division multiple access (CDMA). In these types of systems, for example, those defined by IS-95, an information symbol is represented by a sequence of chips (modulation symbols). As with FDMA and TDMA, multipath propagation in CDMA systems gives rise to signal echoes at the receiver. In a CDMA system, ISI is handled with a Rake receiver.

In all of these systems, speech quality is significant to customer satisfaction. To provide high speech quality at the receiver, advanced demodulation techniques are used in the form of, for example, an equalizer or a Rake receiver. These advanced demodulation techniques require estimating channel tap coefficients, which correspond to different signal delays. These channel tap coefficients are then used in the demodulation process.

Demodulation is typically performed at baseband. In a radio receiver, this occurs after the received signal has been filtered, amplified, mixed down to the baseband frequency, sampled and quantized. This results in a stream of received samples, denoted r(k), which are traditionally modeled as:

$$r(k)=c(0)a(k)+c(1)a(k-1)+ \ldots +n(k) \quad (1)$$

where c(j) are the channel tap coefficients and a(k) are the transmitted symbol values. Complex values are assumed, which correspond to in-phase (I) and quadrature (Q) signal components. In a traditional coherent receiver, the channel tap coefficients are estimated and then used to determine the symbol values from the received data. If a fractionally-spaced receiver is used, then the received data samples are viewed as multiple symbol-spaced data streams multiplexed together. Each symbol-spaced stream is modeled as shown above.

An example is given in the article authored by Y. Wan, Q. Liu and A. M. Sendyk, entitled "A fractionally-spaced maximum-likelihood sequence estimation receiver in a multipath fading environment" and published in ICASSP '92. Therein, differences between what was received and what was expected to be received are squared and summed to form a metric, which is minimized by the detected symbol values. For fractionally-spaced equalization, squared differences are still summed to determine the detected symbol values.

Such traditional approaches treat the transmit pulse shaping or filtering, the transmission medium, and the receive filtering together as one composite channel. If all the received samples have uncorrelated noise samples, then these traditional approaches are optimal. However, because the noise passes through the receive filter, it is bandlimited. Depending on the receive filter response and the sampling rate, the noise samples will be correlated. This occurs in symbol-spaced receivers when the receive filter is matched to the transmit filter and the composite response is not Nyquist. Moreover, partial response modulation schemes are intentionally designed with this property, so as to occupy a smaller bandwidth. This situation also arises in fractionally-spaced receivers when the receive filter is matched to the transmit filter and the filter bandwidth is such that the noise samples are correlated. Under these conditions, the traditional approaches are inaccurate.

One approach to solving this problem, which has been proposed for fractionally-spaced MLSE receivers, is to whiten the samples before traditional signal processing. See, for example, the articles authored by W. H. Sheen and G. St über, entitled "MLSE equalization and decoding for multipath-fading channels" published in IEEE Trans. Commun., Vol. 39, pp. 1455–1464, October 1991 and that authored by K. Hamied and G. L. Stüber, entitled "A fractionally spaced MLSE receiver" and published in ICC '95, Seattle, Wash., Jun. 18–22, 1995. However, if the receive filter is bandlimited or nearly so, then the whitening filter may be impossible or difficult to implement in practice. Also, whitening requires an additional filter in an operation, which adds complexity to the receiver.

Another solution is to use a wider receive filter, so that the noise samples are uncorrelated. A wider, "brick wall" filter is proposed in an article authored by G. M. Vachula and J. F. S. Hill, entitled "On optimal detection of band-limited PAM signals with excess bandwidth" which has been published in IEEE Trans. Commun., Vol. 29, pp. 886–890, June 1981. A practical, wider receive filter has been proposed in an article authored by K. Balachandran and J. B. Anderson, entitled "Receive filters for bandlimited intersymbol interference channels" which has been published in CISS '96, Princeton, N.J., March 1996 and in an article authored by H. Meyr, M. Oerder and A. Polydoros, entitled "On sampling rate, analog prefiltering, and sufficient statistics for digital receivers" and published in IEEE Trans. Commun., vol. 542, pp. 3208–3214, December 1994. However, this solution allows more noise to pass through the receive chain, which can cause saturation problems in, for example, the low noise amplifier when receiver dynamic range is limited. This is particularly troublesome when adjacent channel interference is present.

A similar problem occurs in spread spectrum systems. In a Rake receiver, the baseband samples r(k) correspond to correlations or despread values. These values are traditionally combined using estimates of the composite channel tap coefficients. As with nonspread systems, this is only optimal if the noise samples prior to despreading are uncorrelated. If the correlation spacing is chip-spaced and the chip pulse is not Nyquist or the correlation spacing is fractionally-spaced, then the noise on the despread values is correlated.

Thus, in both nonspread and spread communication systems, there is a need to improve receiver design to efficiently address the problem of noise correlation.

SUMMARY

The aforementioned problems, drawbacks and limitations of conventional signal processing techniques are overcome by the present invention by estimating the medium response separately from other effects, e.g., the effects associated with the receive and transmit filters, using knowledge of the pulse shaping. The medium response estimate is then used advantageously in the detection of information symbols.

For example, the medium response estimate can be used to provide the detection parameters used in a coherent detector to estimate the received information symbols. This application can be extended to array processors wherein a number of receive elements are provided to the receiver.

Moreover, the invention is applicable to both spread and non-spread systems. For spread spectrum receivers, e.g., a rake receiver, the medium response estimates can be used to combine the delayed baseband sample echoes.

BRIEF DESCRIPTION OF FIGURES

The foregoing, and other objects, features and advantages of the present invention will become more apparent upon reading the following detailed description in conjunction with the drawings, wherein.

DETAILED DESCRIPTION

Figure 1:
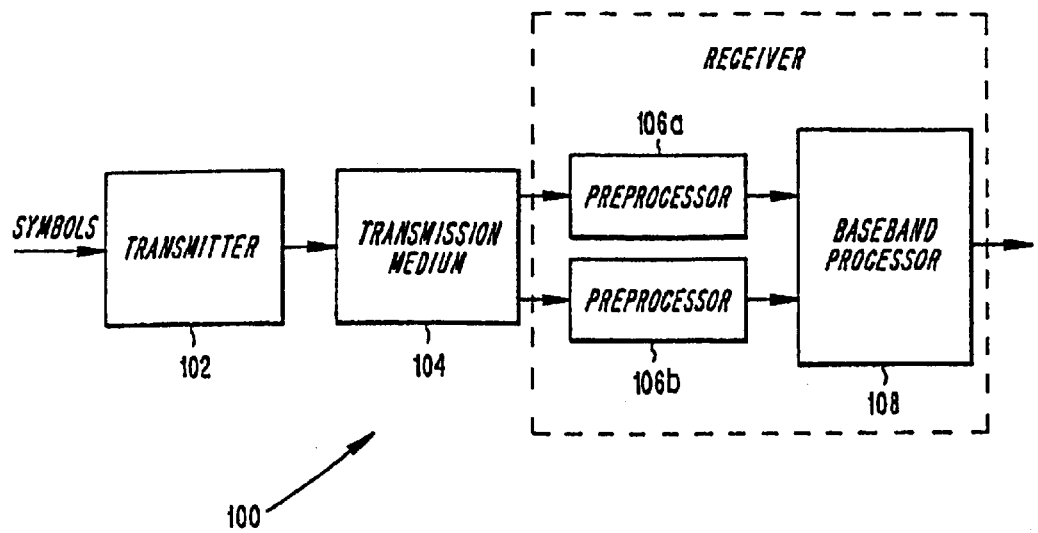
FIG. 1 is a block diagram of a digital communication system.

A digital communications system 100 is shown in FIG. 1. Digital symbols are provided to transmitter 102, which maps the symbol values to a representation appropriate for the transmission medium, e.g., air or wires. The transmitted signal passes through the transmission medium 104 and is received at receiver 105. Two receive channels or elements are shown, which correspond to, for example, two receive antennas in a wireless communications system. Both single and multiple receive channel examples are used, as the present invention is applicable in both cases. The receiver 105 includes preprocessors 106a and 106b, which produce baseband sample values. In a radio communications system, preprocessing comprises filtering, amplification, mixing, sampling and quantization of the received signal. Also, the baseband samples are complex, including both an in-phase (I) and quadrature (Q) component, though the present invention is applicable to systems with other types of samples. If the system is spread-spectrum, then despreading is also included, either before or after the sampling and quantization operations. The purpose of the preprocessor(s) is to provide sufficient or more than sufficient statistics for determining the transmitted symbols. The baseband processor 108 takes the preprocessed samples and produces estimates of the symbol values. Soft or reliability information may also be provided by the baseband processor 108.

Figure 2:
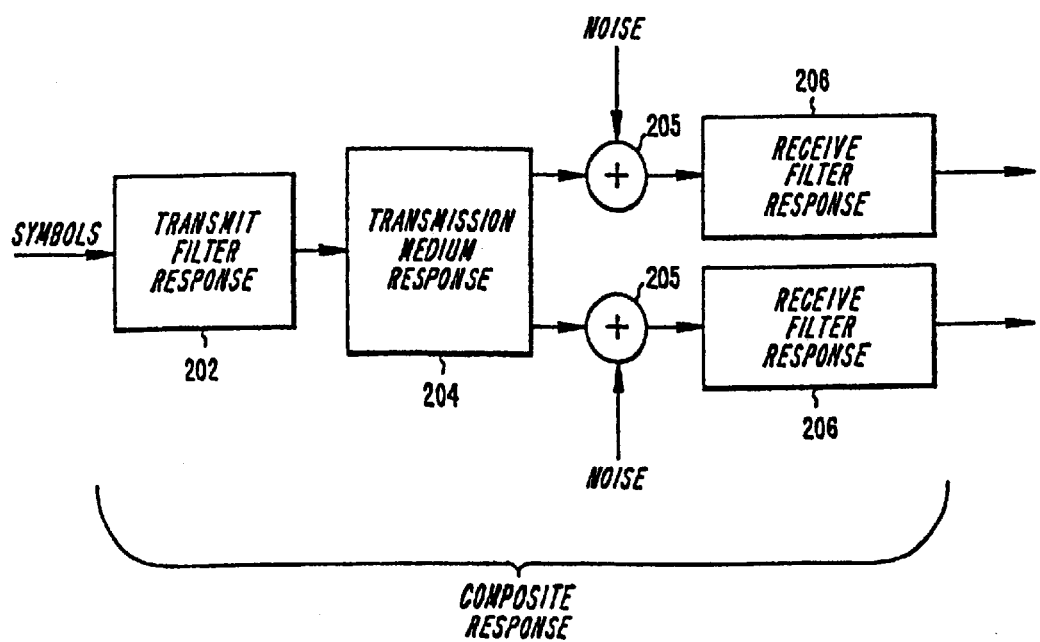
FIG. 2 is an illustration of the composite digital communication channel.

Traditional coherent baseband demodulation includes channel estimation, which is applied to the received samples using detected or known symbol values. The result is an estimate of the composite channel, as illustrated in FIG. 2. The composite channel response includes the response associated with the transmit filter 202, the transmission medium response 204 and the response associated with any receive filters 206. Note that noise, whether thermal noise or interference, is typically added prior to receive filtering, as shown with adders 205. This noise might include, for example, "sky" noise, co-channel interference, and component noise. Thus, while the digital symbols have passed through the composite channel, the noise has only passed through the receive filter.

Figure 3:
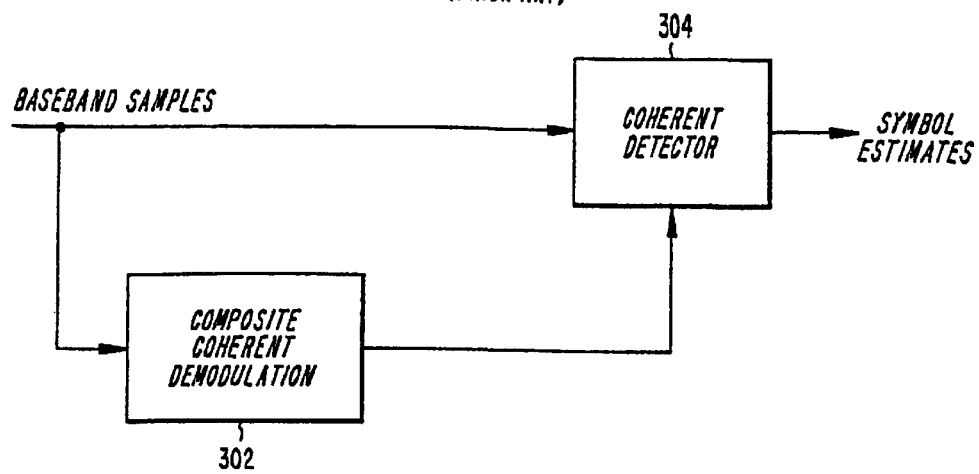
FIG. 3 is an illustration of a conventional baseband signal processor.

Traditional coherent demodulation is illustrated in FIG. 3. The baseband samples are provided to a composite channel estimator 302, which estimates the composite channel response. This response, as well as the baseband samples, are provided to coherent detector 304, which produces symbol estimates. The coherent detector may be an equalizer, a Rake combiner, or some other form of coherent detector.

For example, in a D-AMPS system, the coherent detector may include an MLSE diversity combining receiver, as described in U.S. Pat. No. 5,191,598 or the Wan et al. paper referenced previously. In a direct-sequence, spread-spectrum CDMA system, such as that defined by IS-95, the baseband processor may include a Rake combiner, which combines de-spread or correlation values coherently to form soft detected symbol values. In both these examples, coherent demodulation is used, in that channel tap coefficients are used to assist in demodulating the received signal.

Figure 4:
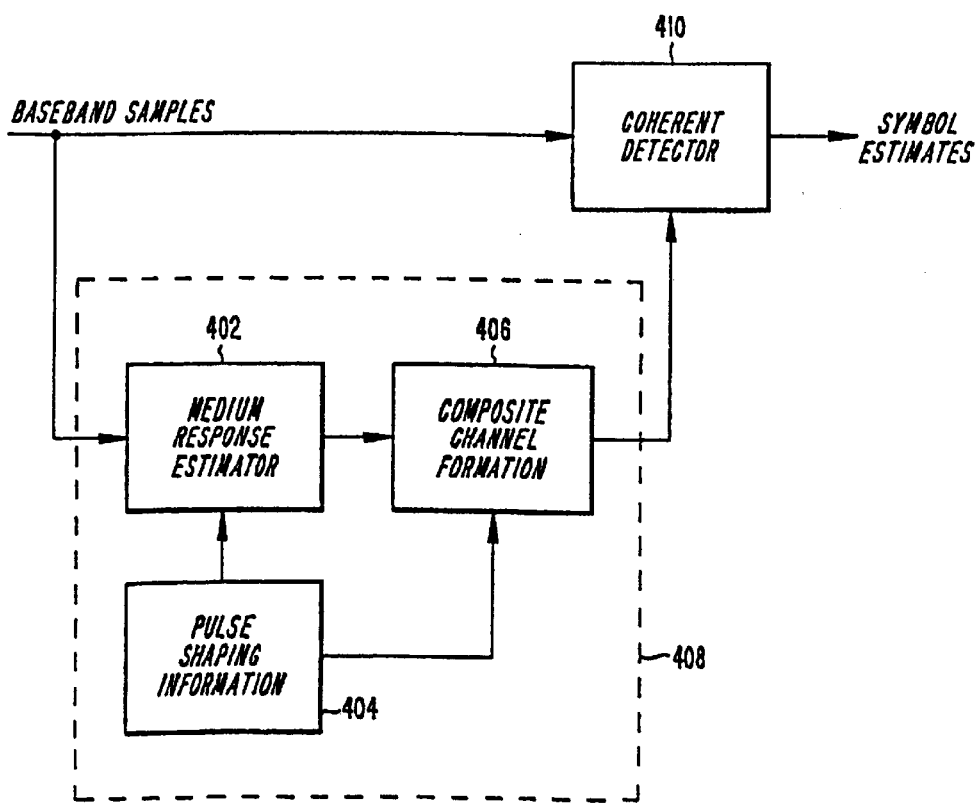
FIG. 4 is an illustration of a second conventional baseband signal processor.

Recently, it has become apparent that knowledge of the transmit and/or receive filter responses can be used to improve estimation of the composite channel response. This is disclosed in U.S. patent application Ser. No. 08/625,010 (filed Mar. 29, 1996), which is incorporated herein by reference. An illustration of how these filter responses can be used is provided in FIG. 4. Baseband samples are provided to medium response estimator 402, which uses pulse shaping information provided by pulse shaping information unit 404 to estimate the medium response. Then, composite channel formation unit 406 combines the medium response estimate with the pulse shaping information to produce composite channel tap coefficient estimates. These composite channel estimates are provided to coherent detector 410, which operates in a similar manner to coherent detector 304. In the above-identified patent application, an apparatus and method are disclosed for producing medium response estimates using baseband samples and pulse shaping information.

Figure 5:
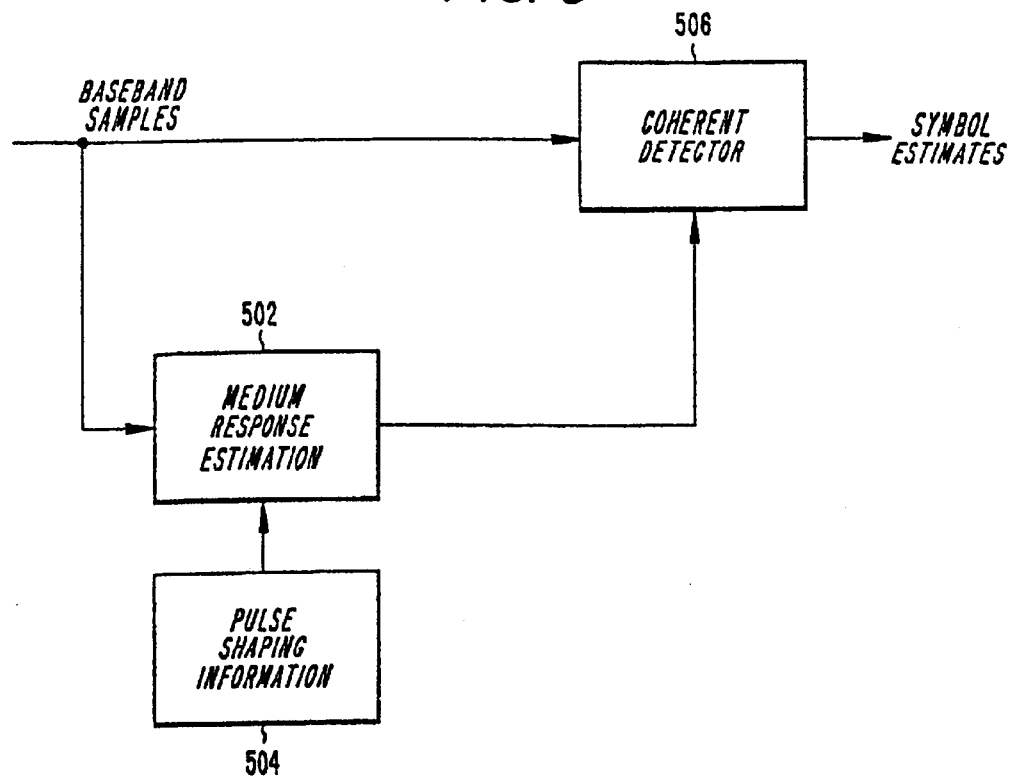
FIG. 5 is an illustration of a baseband signal processor according to an exemplary embodiment of the present invention.

In the present invention, an estimate of the medium response is also produced. However, the medium response estimate is not used as an intermediate step to improve composite channel estimation for demodulation, as in the above-identified patent application. Instead, the medium response estimate is used, possibly in conjunction with pulse shaping information, in an improved coherent detector. An exemplary embodiment is illustrated in FIG. 5. Therein baseband samples are provided to medium response estimator 502, which uses pulse shaping information 504 to estimate the medium response. Then, the medium response, and possibly the pulse shaping information, are provided directly to the coherent detector 506.

In various applications, whether nonspread or spread, coherent detectors according to the present invention combine baseband samples using transmission medium response channel tap coefficient estimates or related quantities. Thus, whereas conventional coherent detection techniques relied upon information regarding the composite channel to provide symbol estimates, the present invention uses information relating to only a part of the composite channel, i.e., the transmission medium response, to obtain these estimates. As will be appreciated by those skilled in the art, implementation details will depend on the application. To illustrate these differences in implementation, several exemplary embodiments of both conventional signal processing techniques and the present invention are provided below.

Figure 6:
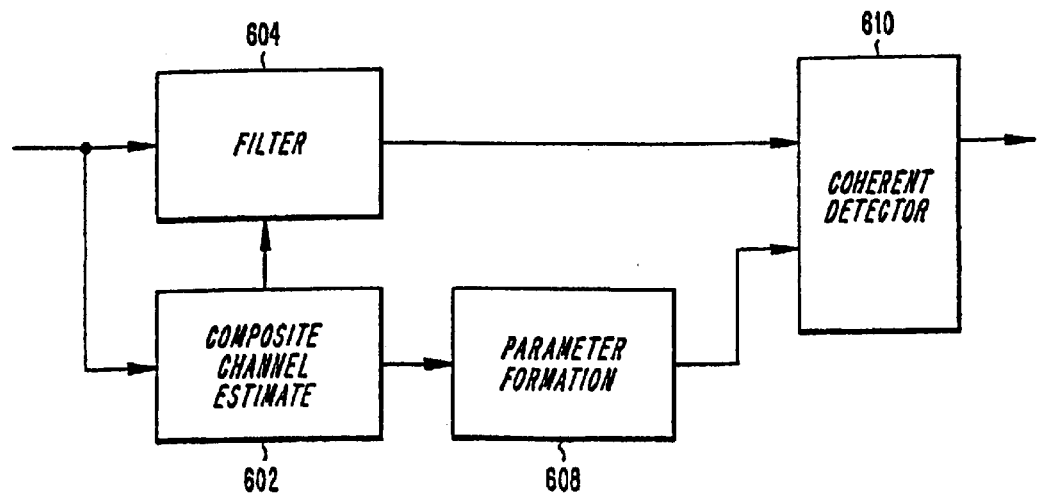
FIG. 6 illustrates a conventional MLSE receiver.

In FIG. 6, a conventional MLSE baseband processor is illustrated. Therein, baseband samples are filtered by filter 604, which use coefficients that correspond to complex conjugates of composite channel estimates provided by composite channel estimator 602. The filtered value is provided to coherent detector 610. Also provided are parameters from parameter formation unit 608, which forms parameters using the composite channel estimates. The coherent detector 610 corresponds to a discrete-time Ungerboeck receiver. A symbol-spaced form of this detector is described in section 4 of an article authored by G. E. Bottomley and S. Chennakeshu, entitled "Adaptive MLSE equalization forms for wireless communications" published in Fifth Virginia Tech Symposium on Wireless Communications, Blacksburg, Va., May 31–Jun. 2, 1995. The detector 610 forms metrics using the filter output, the parameters, and symbol values corresponding to different symbol hypotheses. With aid of the
Viterbi algorithm or some other sequence estimation algorithm, metrics are accumulated and the symbol sequence corresponding to the best accumulated metric gives the detected symbol values.

More specifically, consider an example in which T/2-spaced equalization is used and the composite channel is modeled with 4 taps. The received samples can be denoted $r(kT+mT/2)$, where m is 0 or 1. The received samples are modeled as:

$$r(kT)=c(0; zero)a(k)+c(1; zero)a(k-1) \qquad (2)$$

$$r(kT+T/2)=c(0; one)a(k)+c(1; one)a(k-1) \qquad (3)$$

where c(j; m) denote composite channel tap estimates provided by composite channel estimator 602 and a(k) denote symbol values. The filter 604 forms the following filter output:

$$z(kT)=c^*(0;zero)r(kT)+c^*(0;one)r(kT+T/2)+c^*(1;zero)r(kT+T)+c^*(1;one)r(kT+3T/2) \qquad (4)$$

where superscript "*" denotes complex conjugate. In practice, z(kT) would be computed at time kT+3T/2 or later, delaying the detection process slightly. In essence, z(kT) collects the signal energy associated with symbol a(k).

The parameter formation unit 608 would form the parameters:

$$s(0)=|c(0; zero)|^2+|c(0;one)|^2+|c(1;zero)|^2+|c(1; one)|^2 \qquad (5)$$

$$s(1)=c^*(0;zero)c(1;zero)+c^*(0;one)c(1;one) \qquad (6)$$

Finally, the coherent detector 610 would form metrics to be accumulated using:

$$M_h(k)=\Re\{a_h^*(k)[2z(k)-s(0)a_h(k)-2s(1)a_h(k-1)]\} \qquad (7)$$

where h denotes hypothesis, $a_h(k)$ are hypothesized symbol values, and $\Re$ denotes taking the real part of a complex quantity.

Figure 7:
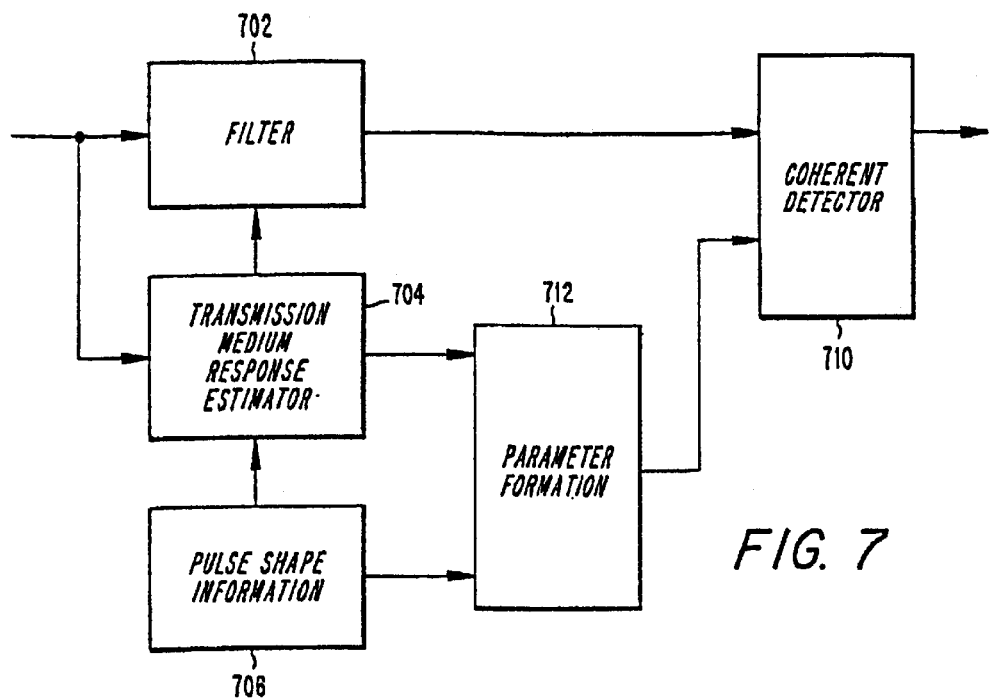
FIG. 7 illustrates an MLSE receiver according to an exemplary embodiment of the present invention.

In FIG. 7, an MLSE receiver according to an exemplary embodiment of the present invention is illustrated. Baseband samples are filtered by filter 702, which uses coefficients that correspond to complex conjugates of the transmission medium response estimates provided by medium response estimator 704. Medium response estimates are obtained using baseband samples and pulse shape information provided by pulse shape information unit 706. The filtered value is provided to coherent detector 710. Also provided are parameters from parameter formation unit 712, which forms parameters using the transmission medium response estimates and pulse shape information. The coherent detector 710 operates in the same way as coherent detector 610 described previously.

For the previous example in which T/2-spaced equalization is used and the medium response is modeled with 4 taps, the baseband equivalent desired signal component at the antenna prior to filtering and sampling by the preprocessor, is modeled as:

$$y(t)=g(0)x(t)+g(T/2)x(t-T/2)+g(T)x(t-T)+g(3T/2)x(t-3T/2) \qquad (8)$$

where x(t) is the transmitted signal given by:

$$x(t) = \sum_k a_k p(t-kT) \qquad (9)$$

and p(t) is the transmit pulse shape for filter response.

At the receiver, the receive filter should be matched to the transmit pulse shape. Assuming this is the case, the received samples, denoted r(kT+mT/2), where m is 0 or 1, can be modeled as:

$$r(kT+mT/2) = \qquad (10)$$
$$\sum_n a_n \sum_j g(jT/2)R_{pp}(kT+mT/2-jT/2-nT)$$

where $R_{pp}(jT/2)$ is the sampled pulse shape autocorrelation, a form of pulse shaping information, given by:

$$R_{pp}(iT/2) = \int p(t+iT/2)p^*(t)dt \quad (11)$$

This function is known in advance since it is based upon the transmit/receive filter design and can be precomputed and stored in the receiver. If the receive filter is not quite matched to the transmit filter, then some performance degradation will occur. This degradation can be minimized by using digital baseband compensation filtering.

In the present invention, the receive samples are filtered, e.g., at block 702, by estimates of the transmission medium response. In general, for T/M-spaced equalization and a medium response of J taps, the filter output can be expressed as:

$$z(kT) = \sum_{j=o}^{J-1} g^*(jT/M)r(kT + jT/M) \quad (12)$$

For the specific example (M=2, J=4), this gives:

$$z(kT) = g^*(0)r(kT) + g^*(T/2)r(kT+T/2) + g^*(T)r(kT+T) + g^*(3T/2)r(kT+3T/2) \quad (13)$$

Observe that the present invention filters with medium response estimates (13), unlike the prior art, which employs composite response estimates (4).

In practice, $z(kT)$ would be computed at time $kT+3T/2$ or later, delaying the detection process slightly. In essence, $z(kT)$ collects all the signal energy associated with symbol $a(k)$ in an optimal way.

The parameter formation unit 712 would form the parameters according to:

$$s(l) = \sum_{j=0}^{J-1} \sum_{k=0}^{J-1} g^*(jT/M)g(kT/M)R_{pp}(lT + (j-k)T/M) \quad (14)$$

For the specific example (M=2, (J=4), it would form parameters:

$s(0)=g^*(0)g(0)R_{pp}(0)+g^*(0)g(T/2)R_{pp}(T/2)+$ $g^*(0)g(T)R_{pp}(-T)+g^*(0)g(3T/2)R_{pp}(0)+$ $g^*(T/2)g(0)R_{pp}(T/2)+g^*(T/2)g(T/2)R_{pp}(0)+$ $g^*(T/2)g(T)R_{pp}(-T/2)+g^*(T/2)g(3T/2)R_{pp}(-T)+$ $g^*(T)g(0)R_{pp}(T)+g^*(T)g(T/2)R_{pp}(T/2)+$ $g^*(T)g(T)R_{pp}(0)+g^*(T)g(3T/2)R_{pp}(-T/2)+$ $g^*(3T/2)g(0)R_{pp}(3T/2)+g^*(3T/2)g(T/2)R_{pp}(T)+$ $g^*(3T/2)g(T)R_{pp}(T/2)+g^*(3T/2)g(3T/2)R_{pp}(0) \quad (15)$ $g^*(0)g(T)R_{pp}(-T)+g^*(0)g(3T/2)R_{pp}(0)+$ $s(1)=g^*(0)g(0)R_{pp}(T)+g^*(0)g(T/2)R_{pp}(T/2)+$ $g^*(0)g(T)R_{pp}(0)+g^*(0)g(3T/2)R_{pp}(-T/2)+$ $g^*(T/2)g(0)R_{pp}(3T/2)+g^*(T/2)g(T/2)R_{pp}(T)+$ $g^*(T/2)g(T)R_{pp}(T/2)+g^*(T/2)g(3T/2)R_{pp}(0)+$ $g^*(T)g(0)R_{pp}(2T)+g^*(T)g(T/2)R_{pp}(3T/2)+$ $g^*(T)g(T)R_{pp}(T)+g^*(i T)g(3T/2)R_{pp}(T/2)+$ $g^*(3T/2)g(0)R_{pp}(5T/2)+g^*(3T/2)g(3T/2)R_{pp}(2T)+$ $g^*(3T/2)g(T)R_{pp}(3T/2)+g^*(3T/2)g(3T/2)R_{pp}(T) \quad (16)$ It will be apparent to those skilled in the art that expressions (15) and (16) above can be further simplified by exploiting the fact that $$R_{pp}(-T) = R_{pp}^*(t)$$

Finally, the coherent detector 710 would operate in the same manner as coherent detector 610 except that it receives samples from filter 702 that have been filtered using estimates of the transmission medium response rather than the composite channel and that parameters received from unit 712 reflect the medium response and pulse shape information.

If multichannel reception is used, for example using multiple diversity antennas, then the general receiver expressions become:

$$z(kT) = \sum_{j=o}^{J-1} g^H(jT/M)r(kT + jT/M) \quad (17)$$

$$s(l) = \sum_j \sum_k g^H(jT/M)g(kT/M)R_{pp}(lT + (j-k)T/M) \quad (18)$$

where the rows in vectors $g(jT/M)$ and $r(kT+jT/M)$ correspond to different receive channels. The superscript H denotes Hermitian transpose.

Figure 8:
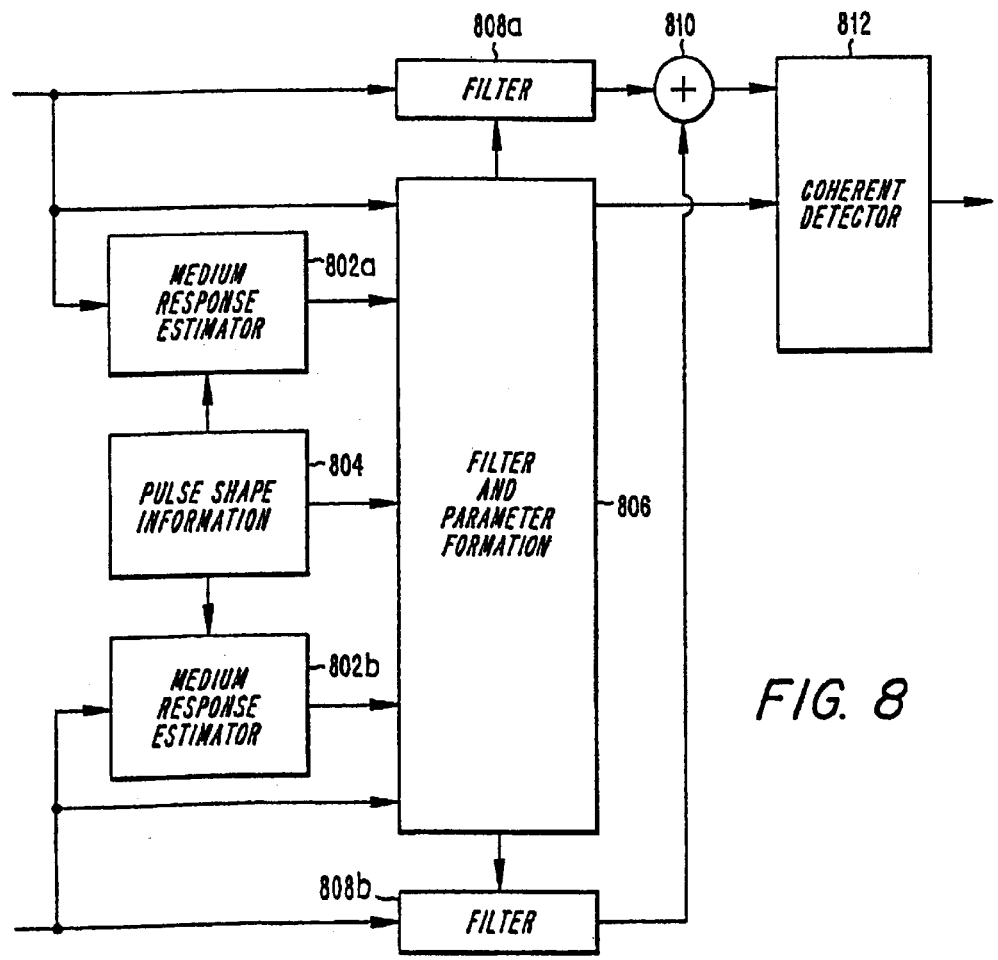
FIG. 8 illustrates an array processing MLSE receiver according to an exemplary embodiment of the present invention.

In cellular systems, interference can be a dominant component of the noise. An array processing MLSE receiver has been developed to exploit this recognition for improved performance, as described in U.S. patent application Ser. No. 08/284,775, to Bottomley, the disclosure of which is expressly incorporated here by reference. In FIG. 8, an array processing MLSE receiver according to the present invention is illustrated.

For each antenna baseband sample stream, two of which are illustrated in FIG. 8, a medium response is estimated in a medium response estimator, i.e., 802a and 802b, using pulse shape information 804. Baseband samples, pulse shape information and medium response estimates are provided to filter and parameter formation unit 806, which determines filter coefficients for filters 808a and 808b as well as parameters for coherent detector 812. Filters 808a and 808b filter the baseband samples and provide results to summer 810, whose output is provided to coherent detector 812. Coherent detector 812 operates in the same manner as coherent detector 710 except for the different inputs supplied thereto.

In filter and parameter formation unit 806, an inverse impairment correlation sequence is estimated and used, with medium response estimates, to form filter coefficients for filters 808a and 808b and parameters for coherent detector 812. The general expressions for the coherent detector inputs of an array processing multichannel receiver are given by:

$$z(kT) = \sum_{j=o}^{J-1} g^H(jT/M)q(kT+jT/M) \quad (19)$$

$$s(l) = \sum_{j}\sum_{k} g^H(jT/M)Q(lT+(j-k)T/M)g(kT/M) \quad (20)$$

where $$q(kT+jT/M) = \sum_{m} \phi^{-1}(mT/M)r(kT+(j-m)T/M) \quad (21)$$

$$Q(lT+(j-k)T/M) = \sum_{m} \phi^{-1}(mT/M)R_{pp}(lT+(j-k-m)T/M) \quad (22)$$

where $\Phi^{-1}(mT/M)$ is an inverse impairment correlation matrix sequence associated with the impairment after ideal bandlimiting (i.e., hypothetical brick wall filtered impairment) to a predetermined signal bandwidth. This inverse impairment correlation matrix sequence can be estimated from the baseband samples, using the medium response and pulse shaping information.

Figure 9:
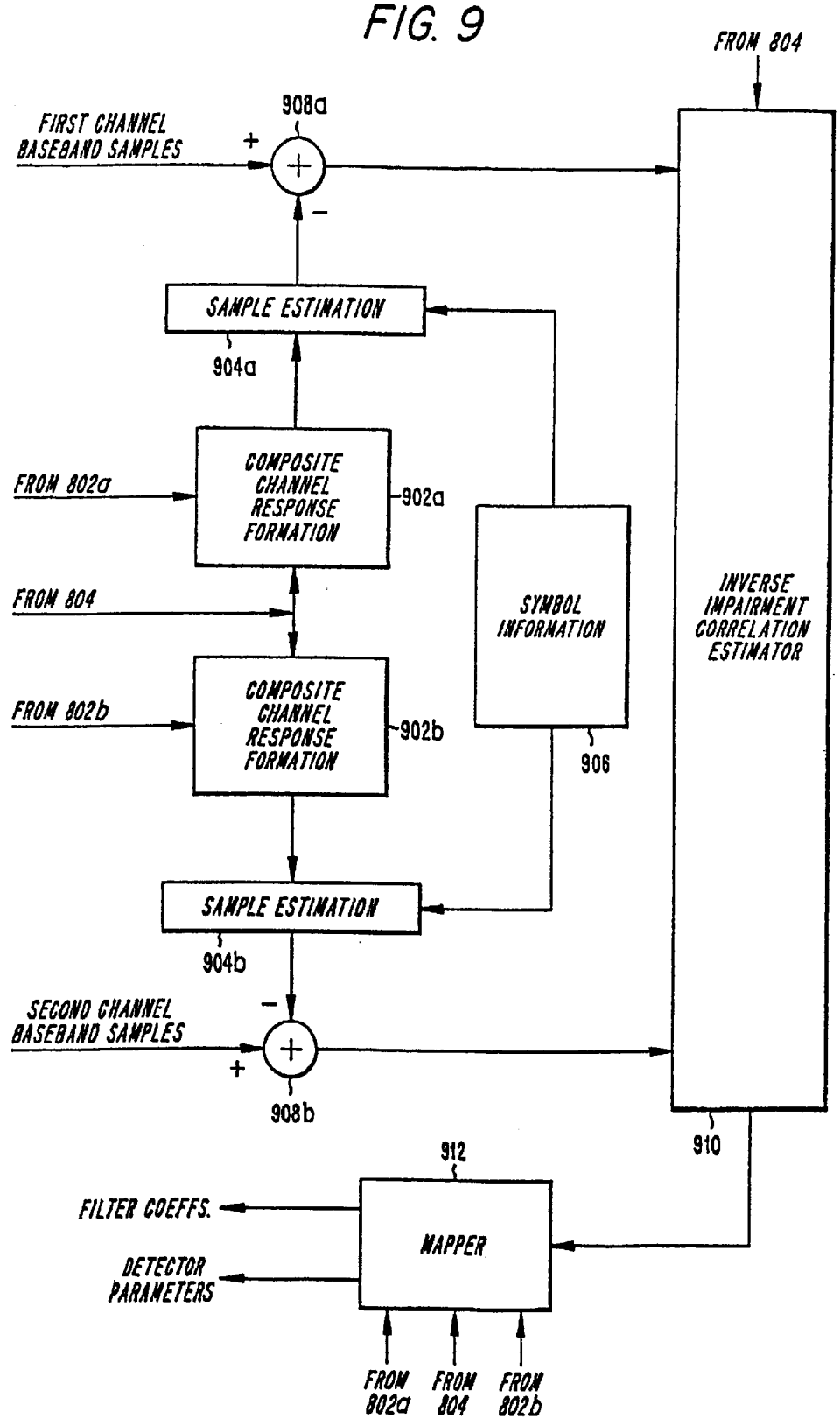
FIG. 9 illustrates a filter and parameter formation unit according to an exemplary embodiment of the present invention.

An exemplary embodiment of the filter and parameter formation unit 806 is illustrated in FIG. 9. Medium response estimates and pulse shaping information are provided to composite channel response formation units 902a and 902b, which form estimates of the composite channel response. These estimates are provided to sample estimators 904a and 904b, which apply the composite channel estimates to symbol values provided by symbol information unit 906 to form desired signal component estimates. Symbol values provided by unit 906 can be known or detected symbol values. The signal estimates are provided to adders 908a and 908b, where they are subtracted from their respective channel's baseband sample values to produce filtered impairment values. These filtered impairment values are provided to inverse impairment correlation estimator 910, which estimates the inverse impairment correlation associated with bandlimited impairment, using pulse shaping information provided by pulse shape information unit 804 in FIG. 8. The inverse calculated by unit 910 is a convolutional inverse, in that the correlation sequence convolved with its inverse gives a new sequence which is zero, except at zero lag, where it is the identity matrix. Note that while composite channel response estimates are formed in this exemplary embodiment, they are only an intermediate step in the process of inverse impairment correlation estimation.

Mapper 912 then collects pulse shaping information, medium response estimates and an inverse impairment correlation estimate and produces filter coefficients and coherent detection parameters according to, for example, equations (19)–(22).

Consider a special case, in which the impairment correlation matrix sequence is all zeroes, except for a nonzero matrix at lag zero. As a result, $$\Phi^{-1}(0) = A \quad (23)$$

and is zero for all other lags. As a result, the receiver expressions simplify to:

$$z(kT) = \sum_{j=0}^{J-1} g^H(jT/M)Ar(kT+jT/M) \quad (24)$$

$$s(l) = \sum_{j}\sum_{k} g(jT/M)^H Ag(kT/M)R_{pp}(lT+(j-k)T/M) \quad (25)$$

Observe that unlike the above-identified Bottomley application, medium response estimates are used instead of composite channel estimates to form the z and s parameters. Moreover, an inverse impairment correlation matrix associated with bandlimited impairment is calculated instead of an inverse impairment correlation matrix associated with filtered impairment, as in the above-identified U.S. patent application Ser. No. 08/284,775.

Figure 10:
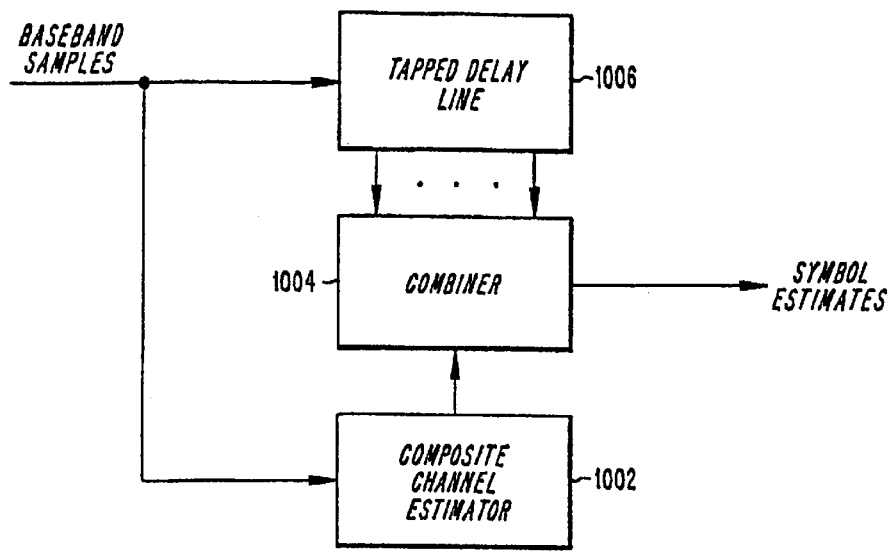
FIG. 10 illustrates a conventional Rake receiver.
Figure 11:
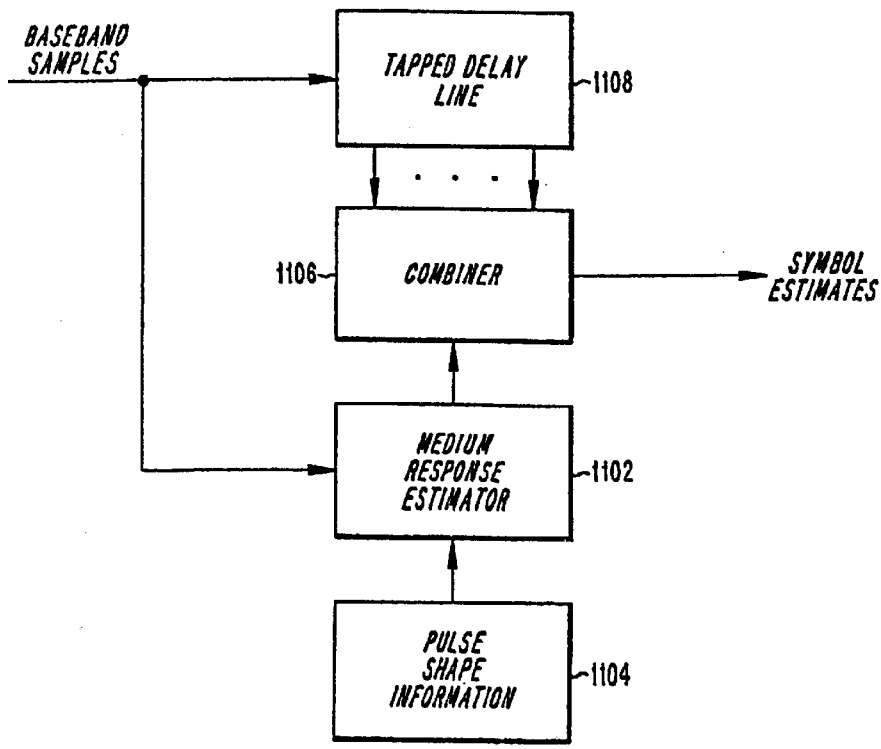
FIG. 11 illustrates a Rake receiver according to an exemplary embodiment of the present invention.

The present invention is also applicable to spread spectrum receivers. Rake reception is used, like an equalizer, to handle echoes of the transmitted signal. In preprocessing the signal, a despreading operation is used to obtain baseband samples or correlation values. In FIG. 10, a conventional coherent Rake combiner is illustrated. Baseband samples are used to estimate a composite channel response in composite channel response estimator 1002. The composite response estimates are used by combiner 1004 to combine baseband sample values stored in tapped delay line 1006. The combined value gives an estimate of the transmitted symbol value.

In FIG. 10, a Rake receiver according to an exemplary embodiment of the present invention is illustrated. Baseband sample values are provided to medium response estimator 1102, which uses pulse shape information from pulse shape information unit 1104 to estimate the medium response. The medium response is provided to combiner 1106, which combines baseband samples stored in tapped delay line 1108 to produce a soft symbol estimate.

If a pilot CDMA channel is available, then the baseband samples can include correlations to the pilot as well as the traffic channel. The pilot correlations would be provided to the medium response estimator 1102, whereas the traffic channel correlations would be stored in the tapped delay line 1108.

The Rake receiver can be implemented in many ways, and the present invention is intended to be used with all such implementations. For example, in the preprocessor, accumulate and dump units may be used to produce correlations only at specific times. These baseband samples would be combined by the combiner. The tapped delay line may be replaced with a memory unit or memory may not be needed. Also, multichannel reception of CDMA signals is possible. Though not illustrated, the symbol values from different antennas would be combined, possibly using a weighted sum to reflect different noise powers on the different antennas.

It will be apparent to those skilled in the art that the present invention can be combined with other receiver techniques. For example, per survivor processing can be applied, in that multiple medium response estimates are kept, corresponding to different possible detected symbol sequences. The medium response estimator may be adaptive, as would be the case in D-AMPS, where the medium response changes with time within a TDMA slot. Also, the receive channels may correspond to antennas, beams, frequencies, time slots, different codes or combinations thereof. Finally, the receiver may perform further signal processing, such as de-interleaving, decoding of error correction or error detection codes, and decryption.

Although exemplary embodiments of the present invention have been described and illustrated herein to facilitate understanding of the present invention, it should be understood that the present invention is not limited thereto since modifications may be made by persons skilled in the art. The present application contemplates any and all such modifications that fall within the scope of the underlying invention disclosed and claimed herein.

What is claimed is:

1. A baseband processor comprising:
   means for producing pulse shaping information;
   means for generating medium response estimates using received baseband samples and said pulse shaping information;
   means for filtering received baseband samples using said medium response estimates as filtering coefficients;
   means for forming detection parameters using said medium response estimates and said pulse shape information; and
   means for detecting information symbols using said detection parameters and said filtered received baseband samples.

2. A baseband processor according to claim 1, wherein said medium response estimates are estimates of the effect of a transmission medium on said information symbols.

3. A baseband processor according to claim 2, wherein said transmission medium includes air.

4. A base processor according to claim 2, wherein said transmission medium includes wire.

5. A baseband processor according to claim 2, wherein said medium response estimates do not include transmit/receive filter responses.

6. A baseband processor according to claim 1, wherein said received baseband samples are received via an array of receive elements.

7. A baseband processor according to claim 6, wherein said means for generating medium response estimates further comprises:
   means for generating medium response estimates associated with each array element.

8. A baseband processor according to claim 6, wherein said means for forming detection parameters using said medium response estimates and said pulse shape information further comprises an inverse impairment correlation estimator.

9. A method for processing information symbols comprising the steps of:
   producing pulse shaping information;
   generating medium response estimates using received baseband samples and said pulse shaping information;
   filtering received baseband samples using said medium response estimates as filtering coefficients;
   forming detection parameters using said medium response estimates and said pulse shape information; and
   detecting information symbols using said detection parameters and said filtered received baseband samples.

10. A method according to claim 9, wherein said medium response estimates are estimates of the effect of a transmission medium on said information symbols.

11. A method according to claim 10, wherein said transmission medium includes air.

12. A method according to claim 10, wherein said transmission medium includes wire.

13. A method according to claim 10, wherein said medium response estimates do not include transmit/receive filter responses.

14. A method according to claim 9, wherein said received baseband samples are received via an array of receive elements.

15. A method according to claim 14, wherein said step of generating medium response estimates further comprises the step of:
   generating medium response estimates associated with each array element.

16. A method according to claim 14, wherein said step of forming detection parameters using said medium response estimates and said pulse shape information further comprises using an inverse impairment correlation estimator.

* * * * *

UNITED STATES PATENT AND TRADEMARK OFFICE
CERTIFICATE OF CORRECTION

PATENT NO. : 6,252,918 B1
DATED : June 26, 2001
INVENTOR(S) : Bottomley et al.

It is certified that error appears in the above-identified patent and that said Letters Patent is hereby corrected as shown below:

Column 7,
Line 45, "$s(0)=g^*(0)g(0)R_{pp}(0)+g^*(0)g(T/2)R_{pp}(T/2)+$" should be changed to
-- $s(0)=g^*(0)g(0)R_{pp}(0)+g^*(0)g(T/2)R_{pp}(-T/2)+$ --
Line 47, "$g^*(0)g(T)R_{pp}(-T)+g^*(0)g(3T/2)R_{pp}(0)+$" should be changed to
$g^*(0)g(T)R_{pp}(-T)+g^*(0)g(3T/2)R_{pp}(-3T/2)+$
Line 58, delete line which currently reads:
$g^*(0)g(T)R_{pp}(-T)+g^*(0)g(3T/2)R_{pp}(0)+$ Equation 15 now read as follows:

$s(0)=g^*(0)g(0)R_{pp}(0)+g^*(0)g(T/2)R_{pp}(-T/2)+$ $g^*(0)g(T)R_{pp}(-T)+g^*(0)g(3T/2)R_{pp}(-3T/2)+$ $g^*(T/2)g(0)R_{pp}(T/2)+g^*(T/2)g(T/2)R_{pp}(0)+$ $g^*(T/2)g(T)R_{pp}(-T/2)+g^*(T/2)g(3T/2)R_{pp}(-T)+$ $g^*(T)g(0)R_{pp}(T)+g^*(T)g(T/2)R_{pp}(T/2)+$ $g^*(T)g(T)R_{pp}(0)+g^*(T)g(3T/2)R_{pp}(-T/2)+$ $g^*(3T/2)g(0)R_{pp}(3T/2)+g^*(3T/2)g(T/2)R_{pp}(T)+$ $g^*(3T/2)g(T)R_{pp}(T/2)+g^*(3T/2)g(3T/2)R_{pp}(0)$

UNITED STATES PATENT AND TRADEMARK OFFICE
CERTIFICATE OF CORRECTION

PATENT NO. : 6,252,918 B1
DATED : June 26, 2001
INVENTOR(S) : Bottomley et al.

It is certified that error appears in the above-identified patent and that said Letters Patent is hereby corrected as shown below:

<u>Column 8,</u>
Line 1, "$g^*(T)g(T)R_{pp}(T)+g^*(i\,T)g(3T/2)R_{pp}(T/2)+$" should be changed to
-- $g^*(T)g(T)R_{pp}(T)+g^*(T)g(3T/2)R_{pp}(T/2)+$ --

Equation 16 should now read as follows:

$s(1)=g^*(0)g(0)R_{pp}(T)+g^*(0)g(T/2)R_{pp}(T/2)+$ $g^*(0)g(T)R_{pp}(0)+g^*(0)g(3T/2)R_{pp}(-T/2)+$ $g^*(T/2)g(0)R_{pp}(3T/2)+g^*(T/2)g(T/2)R_{pp}(T)+$ $g^*(T/2)g(T)R_{pp}(T/2)+g^*(T/2)g(3T/2)R_{pp}(0)+$ $g^*(T)g(0)R_{pp}(2T)+g^*(T)g(T/2)R_{pp}(3T/2)+$ $g^*(T)g(T)R_{pp}(T)+g^*(T)g(3T/2)R_{pp}(T/2)+$ $g^*(3T/2)g(0)R_{pp}(5T/2)+g^*(3T/2)g(3T/2)R_{pp}(2T)+$ $g^*(3T/2)g(T)R_{pp}(3T/2)+g^*(3T/2)g(3T/2)R_{pp}(T)$

Signed and Sealed this

Twenty-ninth Day of April, 2003

JAMES E. ROGAN
*Director of the United States Patent and Trademark Office*